US012781776B2

(12) United States Patent
Spreitzenbarth et al.

(10) Patent No.: US 12,781,776 B2
(45) Date of Patent: Nov. 3, 2026

(54) SAFETY VALVE DEVICE

(71) Applicant: Festo SE & Co. KG, Esslingen (DE)

(72) Inventors: Rainer Spreitzenbarth, Esslingen (DE); Thomas Schaal, Weinstadt (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 19/248,776

(22) Filed: Jun. 25, 2025

(65) Prior Publication Data

US 2025/0389287 A1 Dec. 25, 2025

(30) Foreign Application Priority Data

Jun. 25, 2024 (DE) ......................... 102024117917.1

(51) Int. Cl.
*F15B 20/00* (2006.01)
*F15B 13/04* (2006.01)

(52) U.S. Cl.
CPC .......... *F15B 20/00* (2013.01); *F15B 13/0402* (2013.01)

(58) Field of Classification Search
CPC ............................. F15B 20/00; F15B 13/0402
See application file for complete search history.

(56) References Cited

U.S. PATENT DOCUMENTS 3,768,371 A * 10/1973 Orme ...................... F15B 20/00 91/518
3,776,099 A * 12/1973 Knutson ................. F15B 21/08 91/358 A
4,314,502 A * 2/1982 Brinkel ................... F15B 20/00 91/464
4,513,979 A * 4/1985 Silverman ............. B23B 31/302 91/464
10,760,318 B2 * 9/2020 Fortmann ............. F15B 20/004
11,505,979 B2 * 11/2022 Cho ........................ B23Q 11/08
2004/0108478 A1 * 6/2004 Fortino ................... F15B 20/00 251/59
2005/0067031 A1 * 3/2005 Lee ...................... F15B 13/0402 137/625.69
2007/0130932 A1 * 6/2007 Fatemi .................... F15B 20/00 60/459

(Continued)

FOREIGN PATENT DOCUMENTS

DE 19909920 A1 9/2000
DE 102021213469 B3 7/2022

*Primary Examiner* — Umashankar Venkatesan
(74) *Attorney, Agent, or Firm* — HSML P.C.

(57) ABSTRACT

A safety valve device with a safety valve including a movable valve member and an actuating device by means of which it can be selectively set to a first switching state or to a second switching state. The safety valve module has several module connections, which are module input connections designed to be set to a plurality of different control switching states by a control valve controlling the supply and discharge of a working fluid, and module output connections designed for fluid connection to a double-acting actuator, and module vent connections designed for venting the double-acting actuator designed such that the first switching state is a closed normal position in which the fluid supply to the double-acting drive is blocked and both working chambers of the drive are vented simultaneously, in which the module output connections are fluidically connected to the module vent connections.

17 Claims, 10 Drawing Sheets

(56) References Cited

U.S. PATENT DOCUMENTS

| | | | | |
|---|---|---|---|---|
| 2015/0152898 | A1* | 6/2015 | Banay | F01D 21/00 60/403 |
| 2018/0252243 | A1* | 9/2018 | Pfaff | F15B 13/16 |
| 2018/0313370 | A1* | 11/2018 | Green | F15B 11/044 |
| 2018/0320714 | A1* | 11/2018 | Neef | F15B 20/00 |

* cited by examiner

Fig. 2
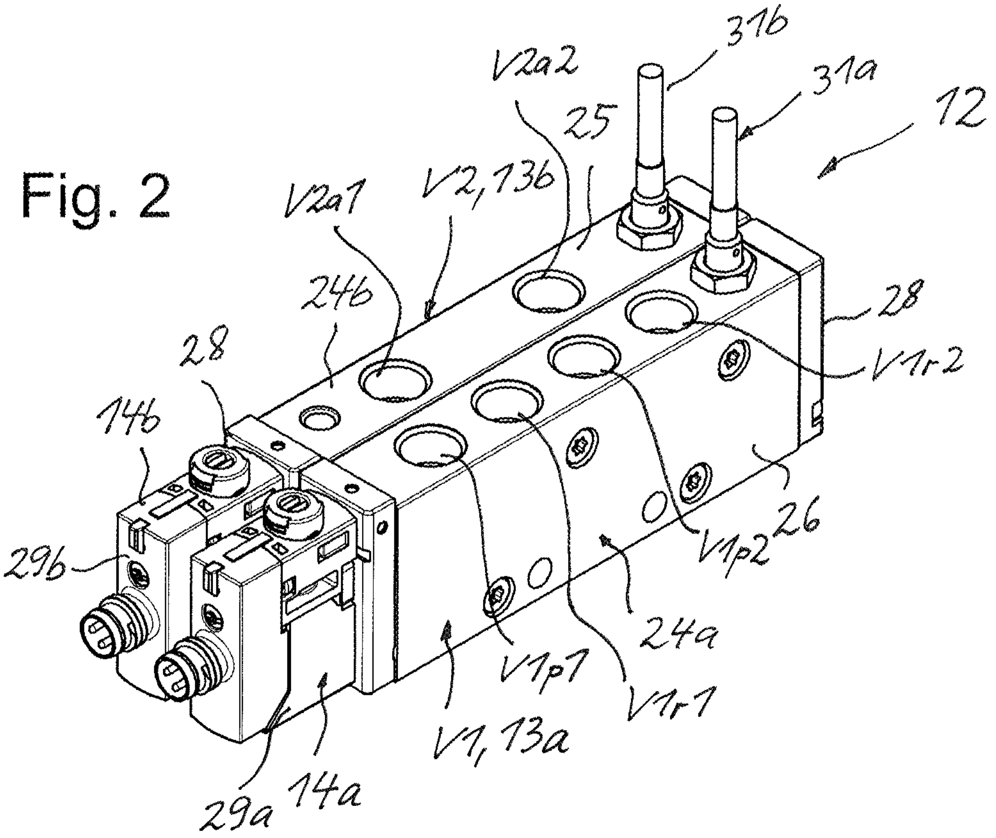
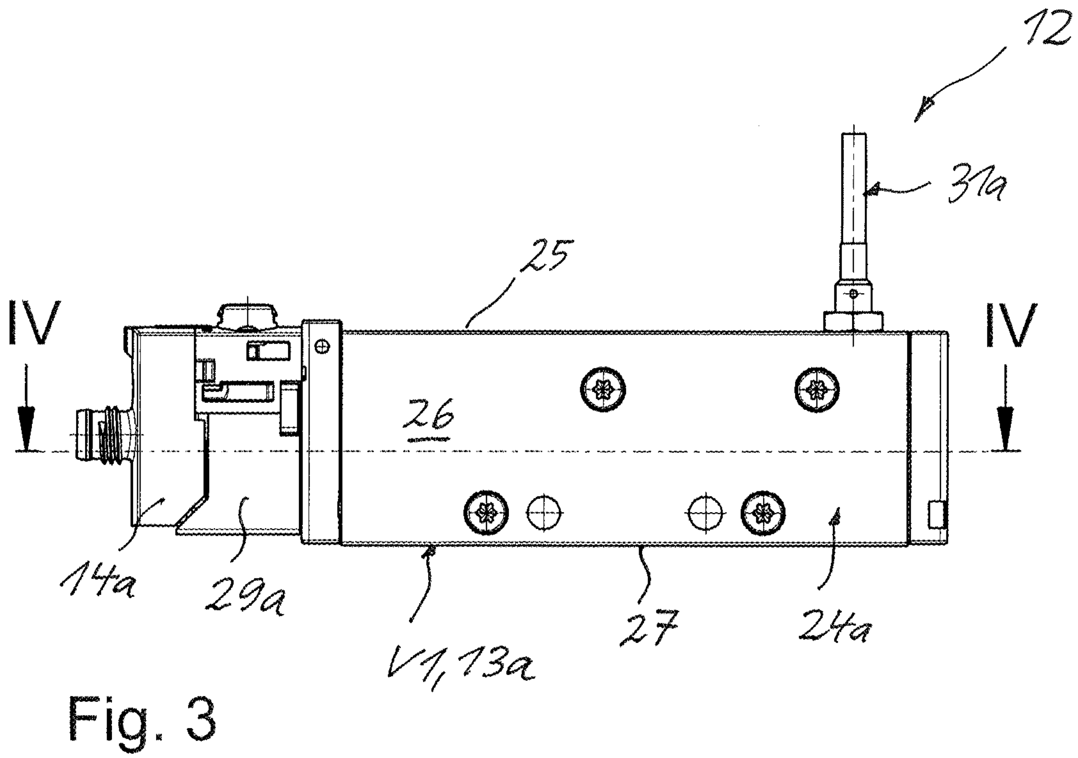
Fig. 3

Fig. 9
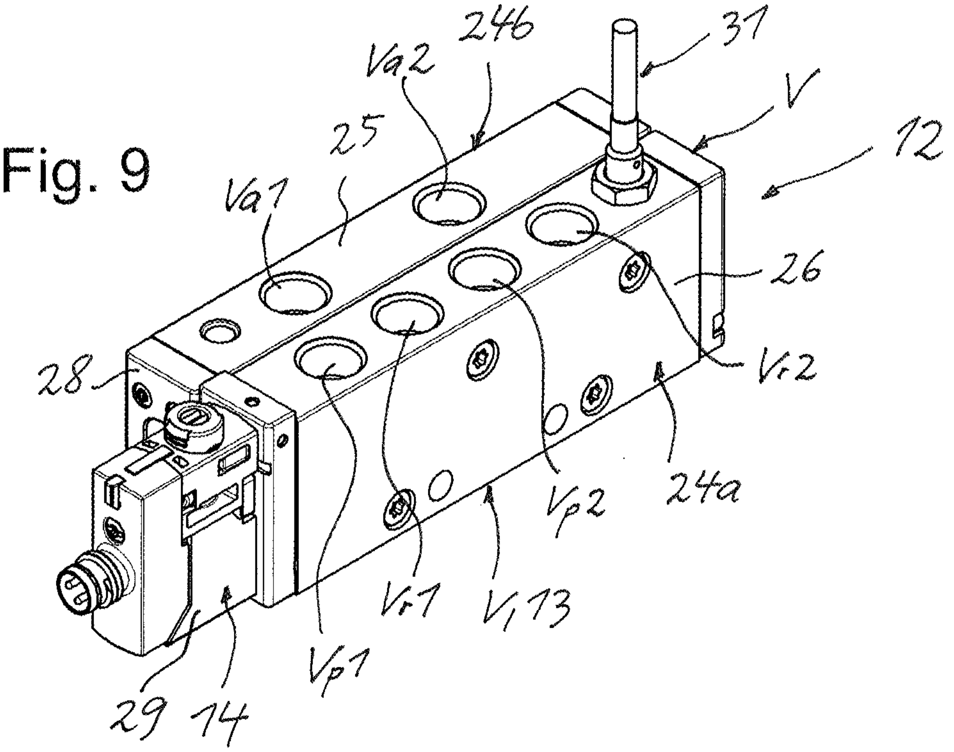
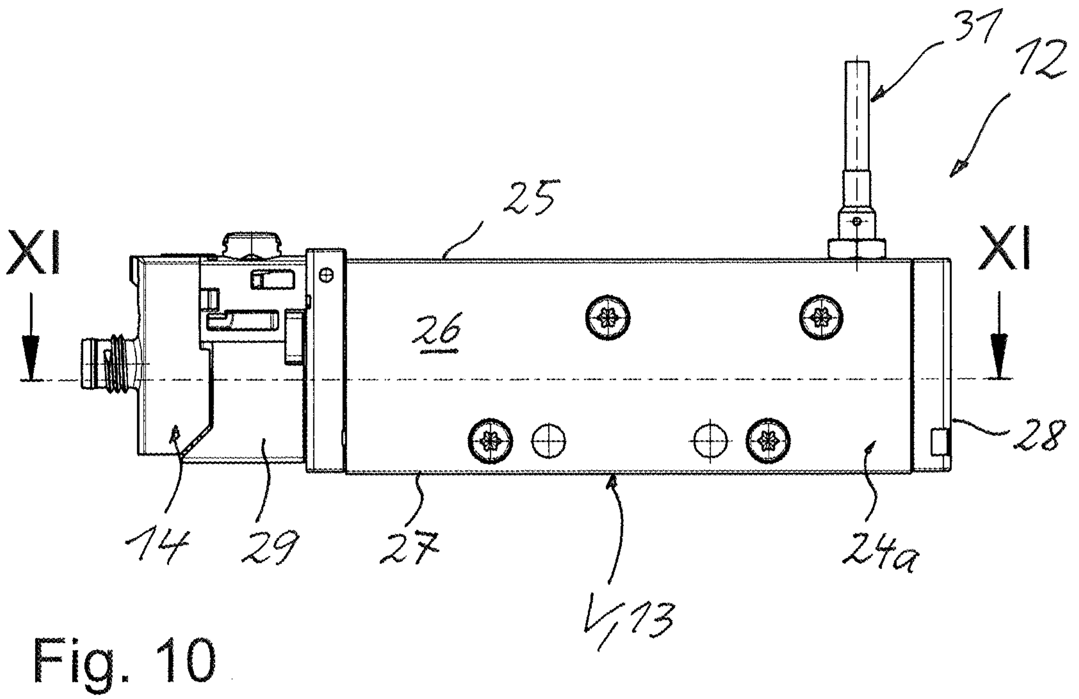
Fig. 10

Fig. 13
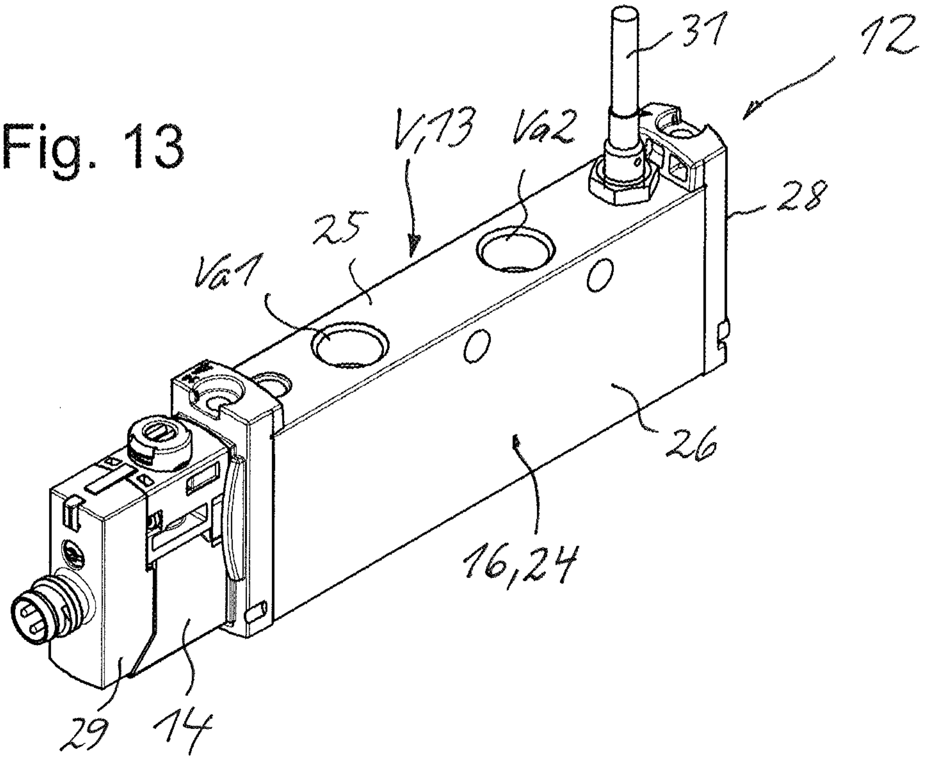
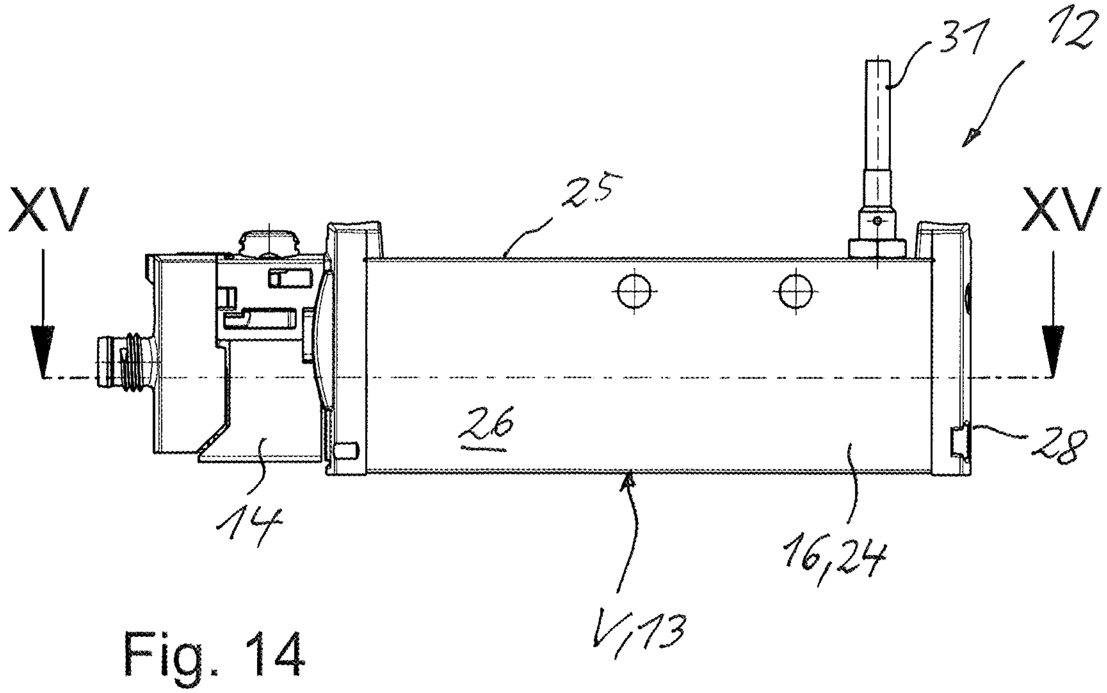
Fig. 14

SAFETY VALVE DEVICE

CROSS REFERENCE

This application claims the benefit of German patent application DE 102024117917.1, filed Jun. 25, 2024, which is incorporated herein by reference.

The invention relates to a safety valve device with a safety valve module comprising at least one safety valve, wherein the at least one safety valve, which has a movable valve member, is assigned an actuating device by means of which it can be selectively set to a first switching state or to a second switching state, wherein the safety valve module has several module connections, which are module input connections designed to be set to several different control switching states by means of a control valve designed to control the supply and discharge of a working fluid, which can be set to a plurality of different control switching states, and module output connections designed for fluid connection to a double-acting actuator, and module vent connections designed for venting the double-acting actuator.

BACKGROUND

A safety valve device of the type mentioned above is known, for example, from DE 10 2021 213 469 B3. The safety valve device described therein has two safety valves connected to each other in a fluid manner, each of which has a 4/2-way valve function. Each safety valve has a first connection port and a second connection port, which are connected to each other in such a way that a fluid flow controlled by a control valve through the two safety valves to a fluid-operated drive is prevented when the two safety valves simultaneously assume a first switching position, and such fluid flow is possible when both safety valves simultaneously assume a second switching state. A safety aspect results from the fact that the aforementioned fluid flow is also prevented when the two safety valves assume different switching states. The arrangement of two fluidically interconnected safety valves is also referred to as a dual-channel design.

DE 199 09 920 A1 discloses a safety valve device which is described in connection with the control of a pneumatic motor. The safety valve device contains two electrically actuated safety valves connected to each other in a fluidic manner, which are designed as 5/3-way valves. The safety valves fulfil a safety function with regard to the shutdown and restart of pneumatic energy, whereby the series connection of the safety valves provides redundancy of the safety function.

SUMMARY

The object of the invention is to provide a safety valve device of the type mentioned above, in which a double-acting pneumatic drive can be vented independently of the switching position of the associated control valve, thereby disabling the drive.

This task is solved by a safety valve device with the features of independent claim 1. Further developments of the invention are described in the subclaims.

The safety valve device according to the invention is characterised in that the actuating device of the safety valve is designed in such a way that the first switching state is a closed normal position, in which the fluid supply to the double-acting drive is blocked and both working chambers of the drive are vented simultaneously, in which the module output connections are fluidically connected to the module vent connections via module vent channels in the safety valve module, which are designed to be fluidically separated from one another.

The normal position of the at least one safety valve thus ensures complete venting of the double-acting actuator so that the actuator is powerless or 'pressureless', regardless of the switching position of the associated control valve or switching valve. This prevents a pressure surge, i.e. unintentional venting of one of the two working chambers of the double-acting actuator, in the event of unintentional incorrect operation of the control valve. Only after the safety valve has been proactively switched to the second switching state can venting of one or the other working chamber of the actuator take place. An essential aspect is that venting takes place via two independently designed and fluidically separated venting channels. This prevents the drive from being influenced during venting, as could be the case with the prior art. In this prior art, which cannot be verified in the literature, the two venting channels are combined and vented together via a single relief channel. In this case, a short-circuit flow could occur from one venting channel to the other and thus from one working chamber to the other, which could lead to unintentional activation of the drive. This is prevented by the fluidically separated venting via two separate venting channels according to the invention, which thus offers an additional safety feature.

In a further development of the invention, the at least one safety valve is of a monostable design and has a return spring which biases the valve member of the safety valve into the closed normal position. This is a simple and inexpensive valve design for keeping the valve in the closed position and also ensures that this closed position is maintained even in the event of a power failure.

In a particularly preferred embodiment, a switching status detection device is assigned to the safety valve, wherein the switching status detection device is preferably arranged on the assigned safety valve in such a way that it is possible to detect whether the valve member is in the closed basic position or in an open position. The switching status detection device or switching position detection device conveniently comprises at least one proximity switch which is capable of detecting the presence of the valve member, the proximity switch preferably being arranged on the side of the return spring so that the presence of the valve member in the open position is detected. In a further development of the invention, the safety valve module has a single safety valve. This variant has the advantage that only a single switching status detection device, for example a single proximity switch, needs to be installed.

Alternatively, however, it is also conceivable that the safety valve module has several, in particular two, safety valves. It is expedient for the at least two safety valves to be connected in such a way that additional safety is provided by redundancy, i.e. in the event of an operating error or a defect in one of the safety valves, safe venting is still ensured by the other safety valve.

This safety function is conveniently achieved by connecting two safety valves in series. However, it is also conceivable to use two safety valves connected in parallel, for example two 3/2-way valves, which then together enable venting of the double-acting actuator.

In a particularly preferred embodiment, the safety valve module has a 6/2 valve function and has two module inlet connections, two module outlet connections and two module vent connections.

In a further development of the invention, the safety valve module has a single 6/2-way safety valve with two valve inlet connections, each of which is fluidically connected to one of the two module inlet connections, with two valve outlet connections, each of which is fluidically connected to one of the two module outlet connections, and with two valve vent connections, each of which is fluidically connected to one of the two module vent connections, wherein, in the closed basic position of the valve element, the two valve inlet connections are blocked and venting can be effected through two separately designed venting channels, each designed between one of the valve outlet connections and an associated valve venting connection.

Alternatively, it is conceivable that the safety valve module has two 6/2-way safety valves connected in series, wherein the safety valves each have two valve inlet connections, which are each fluidly connected to one of the two module inlet connections, two valve outlet connections, which are each fluidly connected to one of the two module output ports and two valve vent ports, each of which is fluidly connected to one of the two vent ports, wherein, in the closed basic position of the valve member, the valve input ports of both the first and second safety valves are blocked, wherein the valve output ports of the first safety valve are coupled to the blocked valve inlet ports of the second safety valve and venting can be effected through two separately formed venting channels, each formed between one of the valve output ports of the second safety valve and an associated module venting port.

In a further development of the invention, the safety valve device has a control valve designed as a five-way valve, in particular a 5/3-way valve, which has a first working channel connected to the first module inlet connection and a second working channel connected to the second module inlet connection and which also has a feed channel connected to a pressure source supplying the working fluid and two venting channels connected to a pressure sink.

In a further development of the invention, the actuating device of the at least one safety valve is of an electrically actuable type.

In a particularly preferred embodiment, the actuating device is designed as an electrically actuable pilot valve device.

The safety valve device is conveniently equipped with an electronic control unit to which the at least one actuating device is connected and which is capable of specifying the switching states of the at least one safety valve. The optional control valve is also preferably connected to this electronic control unit.

In a further development of the invention, the at least one safety valve is designed as a slide valve with a slide-type valve member having a control structure comprising several control sections arranged one behind the other in the longitudinal direction of the valve member, to which annular seals are assigned, with smaller-diameter overflow sections being formed between adjacent control sections.

The seals are advantageously components of a fixed sealing structure on the housing side, whereby a sealing effect preventing fluid overflow is present wherever the control sections are inserted into associated seals.

It is possible that the axial distance between two adjacent seals is greater than the axial length of the associated control section. In this case, known as negative overlap, leakage may occur when the valve element is switched, namely when the control section is located approximately in the middle between two adjacent seals. However, this is not a problem thanks to the separate exhaust air ducting provided by the invention and has no negative effect on the pneumatic drive.

In a further development of the invention, the safety valve module has a module housing on which the module input connections and the module output connections are formed.

In a further development of the invention, the module housing has several, in particular two, valve housing sections, each of which has a housing top side, a housing bottom side, two housing longitudinal sides, in particular parallel to each other, and two housing end faces facing away from each other, wherein the valve housing sections are placed together with two longitudinal sides facing each other, which together form an intermediate wall in which several through-openings are formed through which working fluid can flow.

It is possible that each valve housing section belongs to a safety valve and conveniently encloses the associated valve element. However, it is also possible that one of the valve housing sections functions as a so-called 'blind housing' in which no valve element is accommodated and in which only fluid channels are formed.

BRIEF DESCRIPTION OF THE DRAWINGS

Preferred embodiments of the invention are shown in the drawings and are explained in more detail below.

The drawings show:

FIG. 9 shows a perspective view of the second embodiment of the safety valve device according to the invention, FIG. 10 shows a side view of the safety valve device of FIG. 9, FIG. 11 a longitudinal section through the safety valve device of FIG. 10 along line XI-XI from FIG. 10, FIG. 12 the representation from FIG. 11 with the safety valve in an intermediate position between the basic position and the ventilation switching position shown in FIG. 11, FIG. 13 is a perspective view of a third embodiment of the safety valve device according to the invention, FIG. 14 is a side view of the safety valve device of FIG. 13.

DETAILED DESCRIPTION

FIGS. 1 to 7 show a first embodiment of the safety valve device 11 according to the invention.

Figure 1:
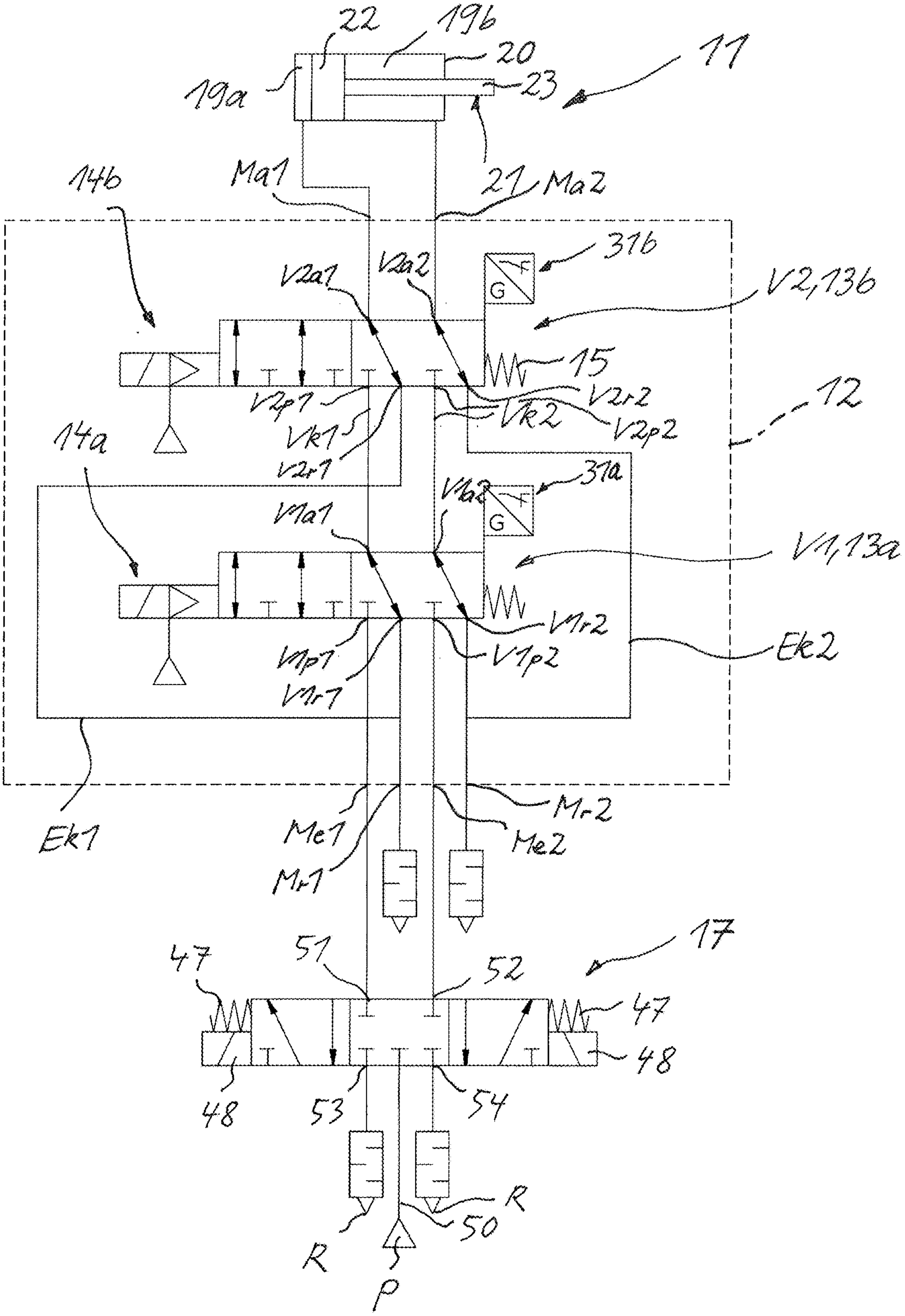
FIG. 1 a first embodiment of the safety valve device according to the invention in a schematic illustration as a circuit, FIG. 2 a perspective view of the first embodiment of the control valve device according to the invention, FIG. 3 a side view of the control valve device of FIG. 2, FIG. 4 a longitudinal section through the control valve device of FIG. 3 along line IV-IV in FIG. 3.

In the example shown, the safety valve device 11 has a safety valve module 12, which is indicated by dashed lines in FIG. 1. The safety valve module 12 has at least one safety valve 13, wherein, according to the first embodiment, two safety valves 13*a*, 13*b* are provided, which are also referred to as safety valves V1 and V2. The two safety valves 13*a*, 13*b* are interconnected in a special way, which is exemplarily realised in a manner to be explained below by means of a first connecting channel VK1 and a second connecting channel VK2.

The two safety valves 13*a*, 13*b* are preferably electrically actuable, for which purpose the first safety valve 13*a* has an electrical first actuating device 14*a* and the second safety valve 13*b* has an electrical second actuating device 14*b*.

By means of the actuating devices 14*a*, 14*b*, each of the safety valves 13*a*, 13*b* can be selectively set to a first switching state or to a second switching state. The electrical control of the actuating devices 14*a*, 14*b* is performed by an electronic control unit (not shown), which is electrically connected to the two actuating devices 14*a*, 14*b* and is advantageously a component of the safety valve device 11.

The two safety valves 13*a*, 13*b* are preferably monostable directional control valves. In this context, they each have a return spring 15 which biases them into the first switching state, so that the first switching state defines a rest state which is present when the actuating devices 14*a*, 14*b* are electrically deactivated.

As shown schematically in FIG. 1 and further in FIGS. 2 to 6, the safety valve module 12 has a module housing 16 on which several module connections are formed. In the example shown, two module input connections Me1, Me2 are provided from the module connections, which serve for fluid connection to a control valve 17 that controls the supply and discharge of a working fluid, in particular compressed air, and can be set to several different control switching states. Furthermore, two module output connections Ma1, Ma2 are provided, which serve for fluid connection to a double-acting drive 18, wherein one of the module output connections Ma1 is connected to a first working chamber 19*a* and the other module output connection Ma2 is connected to the other working chamber 19*b* of the drive 18.

A double-acting pneumatic cylinder can be used as the double-acting drive, for example.

In the example shown, the drive 18 in the form of the double-acting pneumatic cylinder has a cylinder housing 20 in which an output member 21 is movably mounted, wherein, in the example shown, the output member 21 has a piston 22 which divides the interior of the cylinder housing 20 into the two working chambers 19*a*, 19*b*, and a piston rod 23 which is fixed to the piston 22 and extends out of the cylinder housing 20.

According to the first embodiment, the module housing 16 has two valve housing sections 24*a*, 24*b*, each of which is assigned to one of the two safety valves 13*a*, 13*b*. The valve housing sections 24*a*, 24*b* each have a housing top 25, two housing long sides 26 aligned parallel to each other, a housing bottom 27 and two housing end faces 28 facing away from each other.

In addition to the module input connections Me1, Me2 and module output connections Ma1, Ma2 already mentioned, module vent connections Mr1, Mr2 are also formed on the module housing 16, which serve to vent the double-acting drive 18, i.e. in the example case of the double-acting pneumatic cylinder.

As shown in particular in FIG. 2, all module connections are located on the upper sides 25 of the two valve housing sections 24*a*, 24*b*. By way of example, it is shown that the two module input connections Me1, Me2 and the two module vent connections Mr1, Mr2 are formed on the upper housing surface 25 of the first valve housing section 24*a*, while the two module output connections Ma1, Ma2 are provided on the upper housing surface 25 of the other valve housing section 24*b*.

As already mentioned, the two actuating devices 14*a*, 14*b* are of electrical design and are preferably designed as electrically actuated pilot valve devices 29*a*, 29*b*. They can be used to generate the driving force required to switch the valve elements 30*a*, 30*b* of the safety valves 13*a*, 13*b* by means of a fluid force resulting from a pilot fluid.

As shown in particular in FIGS. 2, 4 to 6, the two pilot valve devices 29*a*, 29*b* are each located on one of the housing end faces 28 of the associated valve housing section 24*a*, 24*b*.

As shown schematically in FIG. 1, the two safety valves 13*a*, 13*b* are each assigned switching status detection devices 31*a*, 31*b*, which are arranged on the associated safety valve 13*a*, 13*b* in such a way that it can be detected whether the valve member 30*a*, 30*b* is in the closed basic position or in an open position.

An essential aspect of the invention is that the actuating device 14*a*, 14*b* of the safety valve 13*a*, 13*b* is designed such that the first switching state is a closed basic position in which the fluid supply to the double-acting actuator 18 is blocked and both working chambers 19*a*, 19*b* of the drive 18 can be vented simultaneously, in which the module output connections Ma1, Ma2 are connected fluidically to the module vent connections Mr1, Mr2 via module vent channels Ek1, Ek2 in the safety valve module 12, which are designed to be fluidically separated from one another.

Each valve member 30*a*, 30*b* can be driven to perform a linear reciprocating switching movement 33 relative to the associated valve housing section 24*a*, 24*b*, which is illustrated by a double arrow. The switching movement 33 allows the valve member 30*a*, 30*b* to be positioned either in a closed position, which is the first switching state, or in an open position, which is the second switching state.

The switching movement 33 takes place in a longitudinal direction, which is the axis direction of a longitudinal axis of a valve member receiving space 35, which is formed in each valve housing section 24*a*, 24*b* and in which one of the two valve members 30*a*, 30*b* extends.

Figure 4:
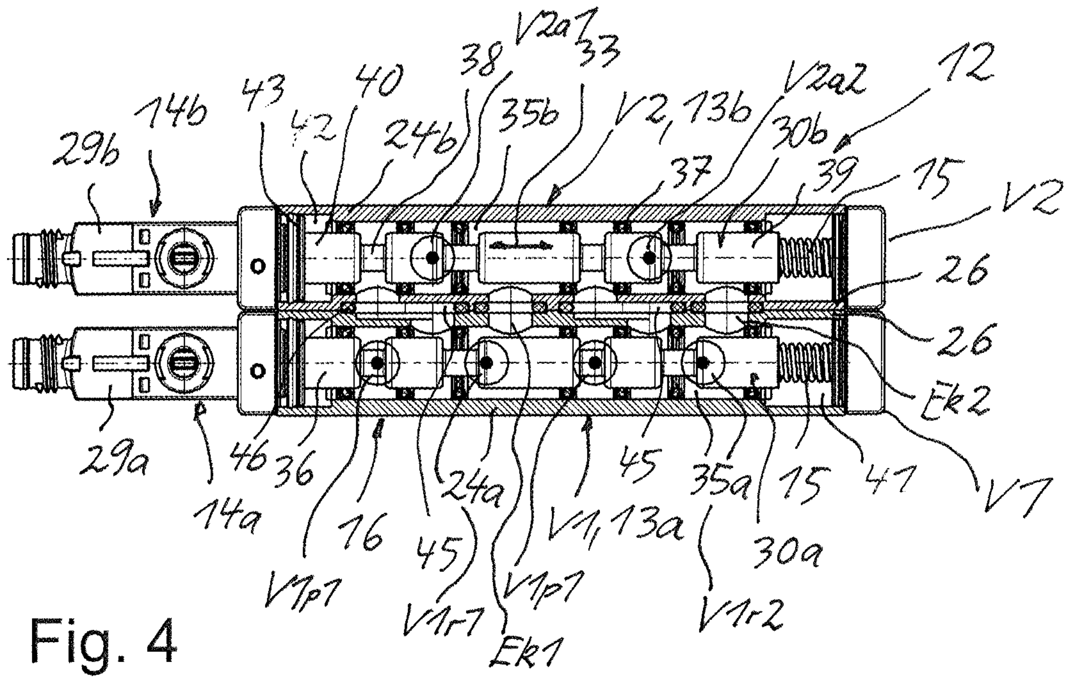
Figure 5:
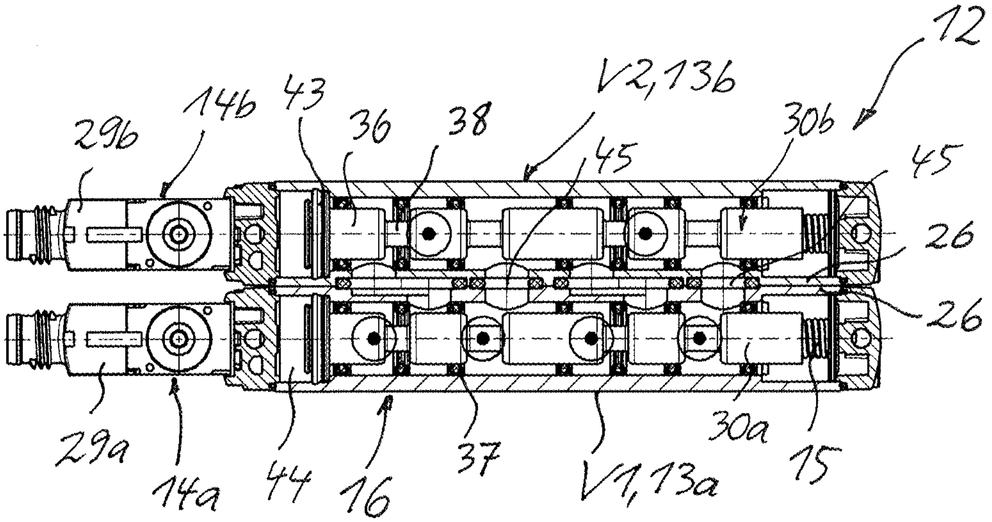
FIG. 5 shows FIG. 4 with the safety valves shown in a venting switch state.

As shown in FIG. 4, the two valve members 30*a*, 30*b* are each designed as slide-type valve members.

The description of the design of one slide-type valve member 30*a* therefore also applies to the other valve member.

As already mentioned, the valve member 30*a*, 30*b* is accommodated in a valve member receiving space 35*a*, 35*b* and has a control structure comprising a plurality of control sections 36 arranged one behind the other in the longitudinal direction 34 of the valve member 30*a*, 30*b*, to which annular seals 37 are assigned, wherein smaller-diameter overflow sections 38 are formed between adjacent control sections 36. The two outermost control sections 36 simultaneously form a first end section 39 and a second end section 40 opposite to this. The first end section 39 extends into a receiving space end section 41 defining one axial end of the valve member receiving space 35*a*, 35*b*, the first end section 39 ending freely.

The return spring 15 is conveniently arranged in the receiving chamber end section 41, where it is designed as a compression spring and is supported on one side by the first end section 39 and on the other side by a closure wall delimiting the receiving chamber end section 41. The second end section 40, which is arranged opposite the first end section 39, projects into a second receiving chamber end section 42 and is connected there to a control piston 43, which in turn delimits a pilot-operated working chamber 44 that can be supplied with pilot fluid. If the pilot-operated working chamber 44 is not supplied with pilot fluid, the return spring 15 constantly biases the valve member in the sectional views to the left so that it is resiliently biased to the closed normal position or closing position defining the first switching state.

As shown in FIG. 4, for example, the seals 37 are components of a sealing structure which is arranged on the housing side and is therefore fixed in relation to the movable valve slide.

A sealing effect preventing fluid overflow is present wherever the control sections 36 are inserted into the seals 37.

Figure 6:
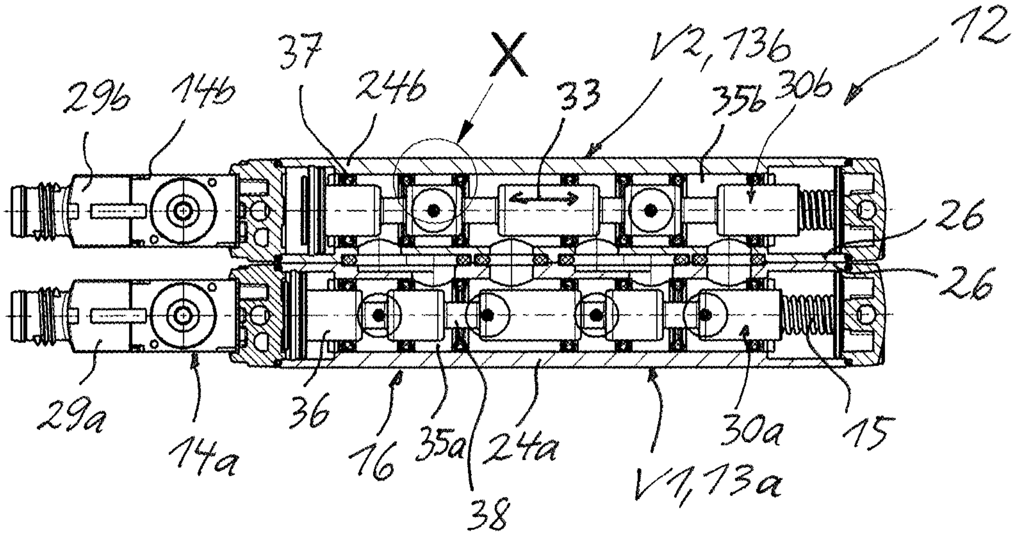
FIG. 6 shows FIG. 4, with the second safety valve shown in a transition position between the basic position and the venting switch position.

As further shown in FIG. 6, the control sections 36 have different longitudinal extensions, i.e. they are of different lengths. Only the two shortest control sections are of equal length and each have an axial longitudinal extension that is shorter than the axial distance between two associated adjacent seals 37.

Figure 7:
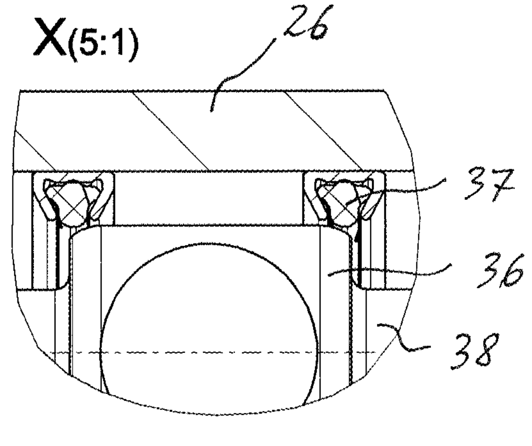
FIG. 7 is an enlarged view of detail X from FIG. 6.

This results in a negative overlap in an intermediate position shown in FIG. 7, in which the relevant control section is located between the two seals 37, whereby leakage may occur between the seals and the control sections, but this has no negative effects according to the invention, as described below.

The control sections, seals 37, and overflow sections 38 are designed such that the safety valves 13*a*, 13*b* are each designed as 6/2-way valves.

As shown in particular in FIG. 1, the first safety valve 13*a* has two valve inlet connections V1*p*1, V1*p*2, two valve working connections V1*a*1, V1*a*2 and two valve vent connections V1*r*1, V1*r*2.

The two valve inlet connections V1*p*1, V1*p*2 are fluidically connected to the module inlet connections Me1, Me2, in particular they are identical to these. The two valve vent connections V1*r*1, V1*r*2 are fluidically connected to the two module vent connections Ma1, Mr2.

The second safety valve also has the same number of valve connections, i.e. two valve inlet connections V2*p*1, V2*p*2, two valve outlet connections V2*a*1, V2*a*2 and two valve vent connections V2*r*1, V2*r*2.

The two valve outlet connections V1*a*1, V1*a*2 of the first safety valve are fluidically connected to the valve inlet connections V2*p*1, V2*p*2 of the second safety valve via the connecting channels Vk1, Vk2.

The two valve outlet connections V2*a*1, V2*a*2 are fluidically coupled to the module outlet connections Ma1, Ma2, in particular identical to these. It is important here that the two valve vent connections of the second safety valve V2*r*1, V2*r*2 are connected to the module vent connections Mr1, Mr2 via the two separately designed vent channels Ek1, Ek2.

As shown in FIG. 4, in accordance with the first embodiment, the two safety valves are placed next to each other with their valve housing sections 24*a*, 24*b* and fastened to each other. In particular, the two facing longitudinal sides 26 of the one and the other valve housing section 24*a*, 24*b* are placed against each other and fastened to each other transversely to the longitudinal direction of the two safety valves 13*a*, 13*b* by means of fastening means, for example by being screwed together by means of fastening screws.

The longitudinal sides of the one and the other valve housing section 24*a*, 24*b* placed against each other form an intermediate wall in which several through-openings 45 are formed, which are each components of either the connecting channels Vk1, Vk2 or the venting channels Ek1, Ek2.

It is advantageous to insert a seal 46 (FIG. 4), for example a ring-shaped seal such as a ring cord seal, at the interface between the two longitudinal sides 26 of the housing. As shown in particular in FIG. 4, which depicts the closed basic position of the two safety valves 13*a*, 13*b*, the double-acting actuator 18 can be vented by allowing the working fluid located there to flow via the module outlet connections Ma1, Ma2, which correspond to the two valve outlet connections of the second safety valve V2*a*1, V2*a*2, and simultaneously flow there via the first venting channel Ek1 and completely separately from this via the second venting channel Ek2 to the module venting connections Mr1, Mr2 and from there, if necessary, exit via a sound absorber.

As shown in particular in FIG. 1, the safety valve module is arranged between the control valve 17, which serves to fluidically control the double-acting actuator, and the double-acting actuator 18.

In the example, the control valve 17 is designed as a 5/3-way valve. In contrast to the two safety valves, the 5/3-way control valve is bistable and has two return springs 47 and two pilot valve devices 48, which ensure that the control valve remains in a first switching state, which is also a closed rest position in which all connections are blocked. In the first switching position, a supply channel 50 is connected to a first working channel 51, while at the same time the second working channel 52 is connected to a pressure sink R.

In the second switching position, the supply channel 50 is connected to the second working channel 52, while the first working channel 51 is connected to a pressure sink R.

The mode of operation of the safety valve device 11 according to the first embodiment can be described as follows:

The control valve 17 is in the first switching position, i.e. in the closed rest position. The two safety valves 13*a*, 13*b* are also in their respective closed default positions due to the spring bias of the return spring 15. In these positions of the safety valves 13*a*, 13*b*, both working chambers 19*a*, 19*b* of the double-acting drive 18 can be vented in which the first working chamber 19*a* is vented via the module output connection Ma1 and the valve output connection V2*a*1 of the second safety valve and the first venting channel Ek1 formed between the valve output connection V2*a*1 and the module venting connection Mr1. The second working chamber 19*b* can be vented via the second module output connection Ma2, the valve output connection V2*a*2 of the second safety valve and the second venting channel Ek2 formed between the second valve output connection V2*a*2 and the second module venting connection Mr2.

Incorrect operation of the control valve or unintentional switching to the second or third switching state does not lead to any change in the situation at the double-acting working cylinder, as the two safety valves remain in their closed basic position and the drive 18 is completely vented.

It should be noted that the closed basic position of the first and second safety valves 13*a*, 13*b* is monitored by the switching state detection device 31*a*, 31*b*, in particular by means of a proximity sensor assigned to the respective valve element 30*a*, 30*b*, which is conveniently arranged on the side of the return springs 15 and does not detect the presence of the valve member in the closed basic position, as this is pressed away from the proximity sensor by the return spring.

In order to extend the piston rod 23, it is necessary to vent the first working chamber 19*a* and, while the second working chamber 19*b* is being vented. For this purpose, the two safety valves are switched from the closed basic position to the open position by supplying pilot fluid to the pilot working chambers 44, so that when the control valve is switched to the second switching position, in which the pressure source P and the feed channel are connected to the first working channel, working fluid flows via the first module inlet connection Me1, the valve inlet connection V1*p*1 of the first safety valve 13*a*, the first connecting channel Vk1, the valve inlet connection V2*p*1 of the second safety valve 13*b*, and the first module outlet connection Ma1. At the same time, the second working chamber 19*b* is vented via the second module output connection Ma2, valve input connection V2A2 of the second safety valve 13*b*, the second connecting channel Vk2, the valve input connection V1*p*2 of the first safety valve 13*b*, the second working channel 52 and the pressure sink R.

When the piston rod 23 is retracted, the control valve 17 is switched to the third switching position and vented via the paths that were previously vented and vented via the paths that were previously ventilated.

FIGS. 9 to 12 show a second embodiment of the safety valve device 11 according to the invention.

In contrast to the first embodiment described above, the safety valve device 11 according to the second embodiment comprises a safety valve module 12 with a single safety valve 13, which is designed as a 6/2-way valve.

The structure of the safety valve 13 according to the second embodiment corresponds to the structure of one of the previously described safety valves 13*a*, 13*b* of the first embodiment, so reference is made thereto.

Although a module housing with two valve housing sections 24*a*, 24*b*, only one of these valve housing sections 24*a* is equipped with a safety valve 13, while the other serves as a kind of blind housing and only has the channel structure of the second valve housing section without a valve element located therein.

Figure 8:
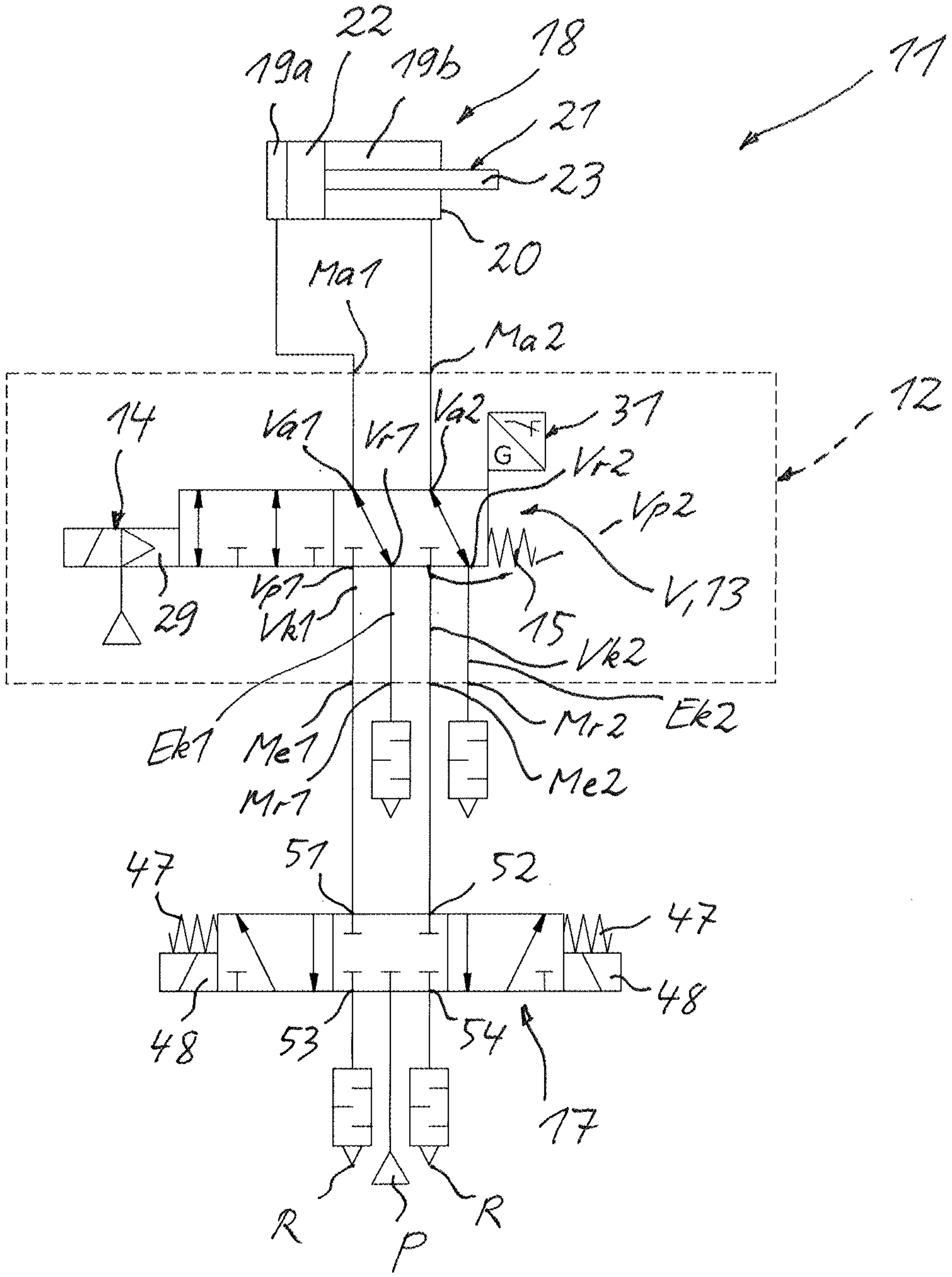
FIG. 8 shows a second embodiment of the safety valve device according to the invention in a schematic illustration as a circuit.
Figure 11:
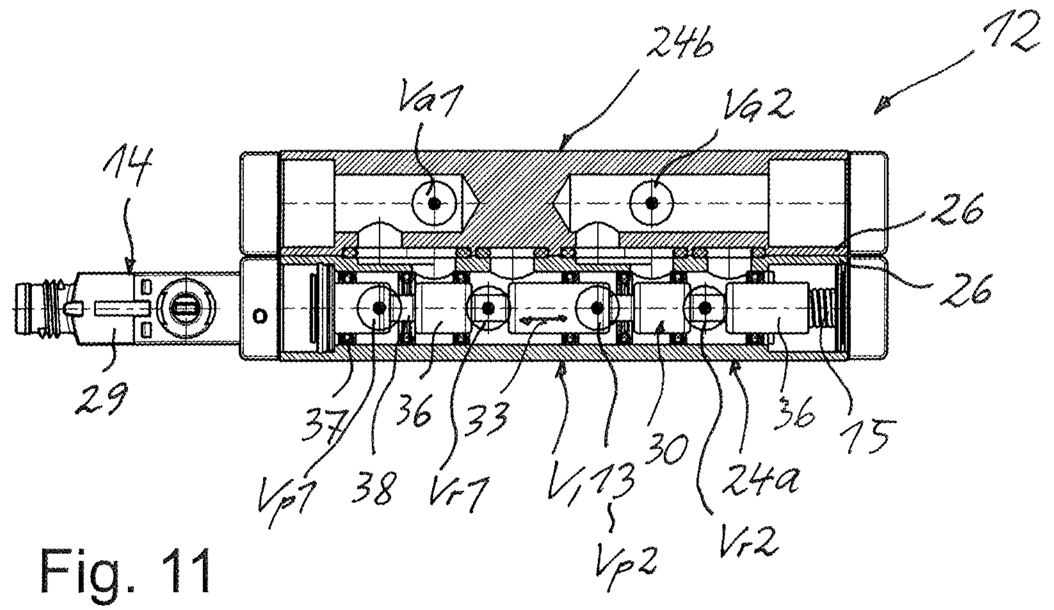
Figure 12:
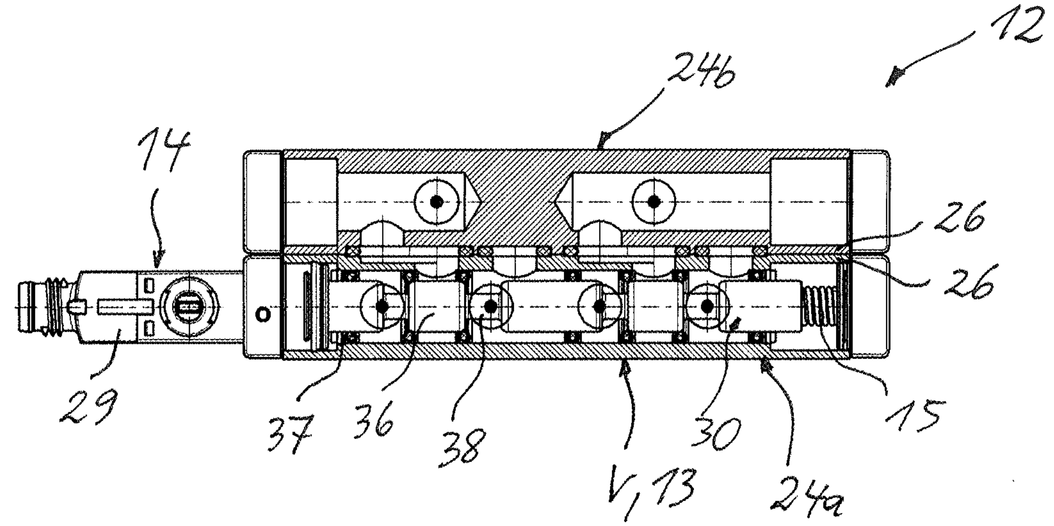
Figure 15:
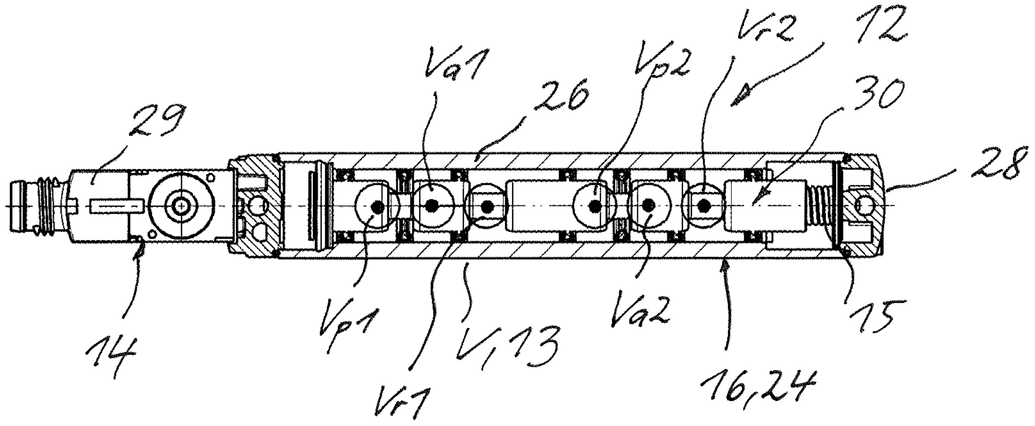
FIG. 15 is a longitudinal section through the safety valve device of FIG. 14 along line XV-XV of FIG. 14.
Figure 16:
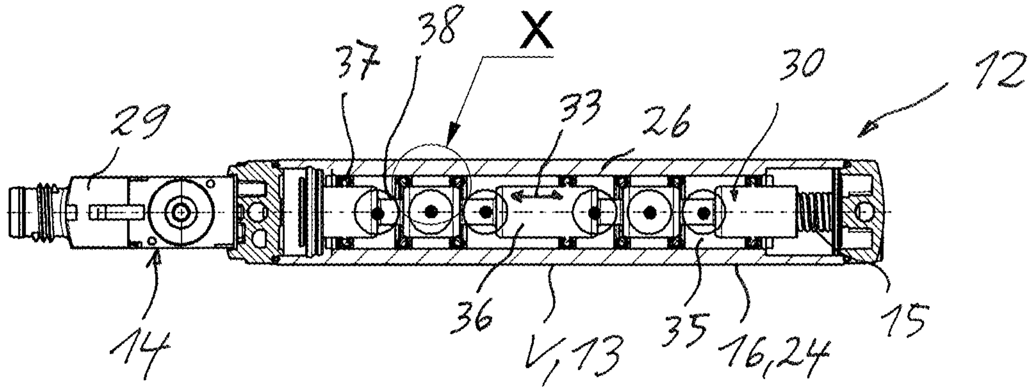
FIG. 16 shows a view according to FIG. 15, with an intermediate position of the safety valve between the basic position and the ventilation switching position.
Figure 17:
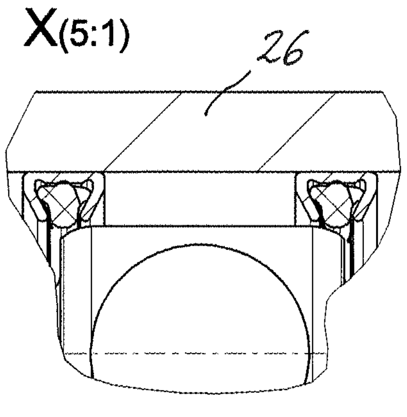
FIG. 17 shows an enlarged view of detail X from FIG. 16.

The interconnection of control valve 17, which is also designed as a 5/3-way valve in this example, safety valve 13 and double-acting actuator 18 is shown in FIG. 8.

Here too, two module input connections Me1, Me2, two module output connections Ma1, Ma2 and two module vent connections Mr1, Mr2 are provided.

The module input connections Me1, Me2 are identical to the valve input connections Vp1, Vp2. The module output connections Ma1, Ma2 are also identical to the valve output connections Va1, Va2. The module vent connections Mr1, Mr2 are also identical to the valve vent connections Vr1, Vr2.

In the closed basic position shown in FIG. 8, the double-acting actuator 18 is completely vented via the two independently designed vent channels Ek1 and Ek2, which are formed between the module output connections Ma1, Ma2 and the module vent connections Mr1, Mr2.

FIGS. 13 to 17 finally show a third embodiment of the safety valve device 11 according to the invention, in which a single safety valve 13 is also provided, which, in contrast to the second embodiment described above, is located in a single valve housing which also forms the module housing 16.

The connection to the control valve and the double-acting pneumatic actuator 18 corresponds to the diagram shown in FIG. 8.

The invention claimed is:

1. A safety valve device with a safety valve module comprising at least one safety valve, wherein the at least one safety valve comprising a movable valve member is assigned, an actuating device is assigned to the at least one safety valve comprising the movable valve member, by means of which it can be selectively set to a first switching state or to a second switching state, wherein the safety valve module has a plurality of module connections which are module input connections designed to be set to a plurality of different control switching states by a control valve controlling the supply and discharge of a working fluid, and module output connections designed for fluid connection to a double-acting actuator, and module vent connections designed for venting the double-acting actuator, wherein the actuating device of the safety valve is designed such that the first switching state is a closed normal position in which the fluid supply to the double-acting drive is blocked and both working chambers of the drive are vented simultaneously, in which the module output connections are fluidically connected to the module vent connections via module vent channels in the safety valve module that are designed to be fluidically separated from one another.

2. The safety valve device according to claim 1, wherein the safety valve is of a monostable design and has a return spring by which the valve member of the safety valve is biased into the closed basic position.

3. The safety valve device according to claim 1, wherein the safety valve is assigned a switching status detection device is assigned to the safety valve, wherein the switching status detection device is arranged on the assigned safety valve in such a way that it can be detected whether the valve member is in the closed basic position or in an open position.

4. The safety valve device according to claim 1, wherein the safety valve module has a single safety valve.

5. The safety valve device according to claim 1, wherein the safety valve module has several safety valves.

6. The safety valve device according to claim 5, wherein the two safety valves are connected in series.

7. The safety valve device according to claim 1, wherein the safety valve module has a 6/2 valve function and two module input connections, two module output connections and two module vent connections.

8. The safety valve device according to claim 7, wherein the safety valve module has a single 6/2-way safety valve with two valve inlet connections, each of which is fluidically connected to one of the two module inlet connections, with two valve outlet connections, each of which is fluidically connected to one of the two module outlet connections and with two valve vent connections which are each fluidically connected to one of the two module vent connections, wherein, in the closed basic position of the valve member, the two valve inlet connections are closed and venting is possible through two separately formed venting channels, each formed between one of the valve output connections and an associated valve venting connection.

9. The safety valve device according to claim 7, wherein the safety valve module has two 6/2-way safety valves connected in series, wherein the safety valves each have two valve inlet connections, which are each fluidically connected to one of the two module inlet connections, two valve outlet connections, which are each fluidically connected to one of the two module output ports, and two valve vent ports, which are each fluidically connected to one of the two module vent connections, wherein, in the closed basic position of the valve member, the valve inlet connections of the first safety valve are coupled to the blocked valve inlet connections of the second safety valve and venting is provided by two separately formed venting channels, each formed between one of the valve outlet connections of the second safety valve and an associated module venting connection.

10. The safety valve device according to claim 1, wherein it has a control valve designed as a five-way valve, which has a first working channel connected to the first module input connection connected to the first module input connection and a second working channel connected to the second module input connection, and which further has a feed channel connected to a pressure source supplying the working fluid and two vent channels connected to a pressure sink.

11. The safety valve device according to claim 1, wherein the actuating device of the at least one safety valve is of an electrically actuable design.

12. The safety valve device according to claim 11, wherein the actuating device is designed as an electrically actuated pilot valve device.

13. The safety valve device according to claim 1, wherein the at least one safety valve is designed as a slide valve with a slide-type valve member which has a control structure comprising several control sections arranged one behind the other in the longitudinal direction of the valve member and to which annular seals are assigned, wherein overflow sections of smaller diameter are formed between adjacent control sections.

14. The safety valve device according to claim 13, wherein the seals are components of a fixed sealing structure on the housing side, whereby a sealing effect preventing fluid overflow is present wherever the control sections are inserted into associated seals.

15. The safety valve device according to claim 1, wherein the axial distance between two adjacent seals is greater than the axial longitudinal extension of the associated control section.

16. The safety valve device according to claim 1, wherein the safety valve module has a module housing on which the module inlet connections, the module output connections and the module vent connections are formed.

17. The safety valve device according to claim 16, wherein the module housing has several valve housing sections, each of which has a housing top side, a housing bottom side, two housing long sides aligned parallel to one another, and two housing end sides facing away from one another, wherein the valve housing sections are placed next to each other with two housing longitudinal sides facing each other, which together form an intermediate wall in which several through-openings are formed through which working fluid can flow.

* * * * *